(12) United States Patent
Nakagawa et al.

(10) Patent No.: US 8,193,820 B2
(45) Date of Patent: Jun. 5, 2012

(54) OCCUPANT DETECTION SYSTEM

(75) Inventors: Hajime Nakagawa, Nagoya (JP);
Hiroyuki Ito, Obu (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 350 days.

(21) Appl. No.: 12/653,318

(22) Filed: Dec. 11, 2009

(65) Prior Publication Data
US 2010/0171515 A1 Jul. 8, 2010

(30) Foreign Application Priority Data

Dec. 11, 2008 (JP) .................................. 2008-316102

(51) Int. Cl.
*G01R 27/26* (2006.01)
*G08B 13/26* (2006.01)

(52) U.S. Cl. ........................................ 324/663; 340/562
(58) Field of Classification Search .................. 324/663; 340/562
See application file for complete search history.

(56) References Cited

U.S. PATENT DOCUMENTS

| 6,392,542 | B1 * | 5/2002 | Stanley .......................... 340/561 |
| 7,191,044 | B2 * | 3/2007 | Thompson et al. ............. 701/45 |
| 7,401,532 | B2 | 7/2008 | Wanami |
| 2003/0154805 | A1 | 8/2003 | Takafuji et al. |
| 2004/0249536 | A1 | 12/2004 | Hattori et al. |
| 2007/0027599 | A1 | 2/2007 | Sakai et al. |
| 2008/0204264 | A1 | 8/2008 | Sakai |

FOREIGN PATENT DOCUMENTS

| JP | 11-271463 | 10/1999 |
| JP | 2002-221579 | 8/2002 |
| JP | 2003-240628 | 8/2003 |
| JP | 2003-315141 | 11/2003 |
| JP | 2004-291668 | 10/2004 |
| JP | 2006-281990 | 10/2006 |
| JP | 2007-030676 | 2/2007 |
| JP | 2007-225443 | 9/2007 |
| JP | 2008-213506 | 9/2008 |

* cited by examiner

*Primary Examiner* — Amy He
(74) *Attorney, Agent, or Firm* — Harness, Dickey & Pierce, PLC

(57) ABSTRACT

An occupant detection system is a part of a vehicle occupant protection system. The vehicle occupant protection system is enabled to be activated when the occupant detection system determines an ON state indicative of existence of an occupant on a seat. The vehicle occupant protection system is disabled to be activated when the occupant detection system determines an OFF state. The system includes a capacitive sensor which detects the occupant based on a capacitance around the seat. The system determines the ON state or the OFF state based on the detected value of the capacitive sensor and a predetermined threshold value. The system evaluates whether the determination result in the determination block is appropriate or not. Then, the system biases the threshold value to suppress a reversal determination from the determination result which is evaluated as appropriate.

6 Claims, 8 Drawing Sheets

OCCUPANT DETECTION SYSTEM

CROSS REFERENCE TO RELATED APPLICATION

This application is based on Japanese Patent Application No. 2008-316102 filed on Dec. 11, 2008, the contents of which are incorporated herein by reference in its entirety.

FIELD OF THE INVENTION

The present invention relates to an occupant detection system for detecting an occupant on a seat. Specifically, the present invention relates to an occupant detection system which determines whether it is in an OFF state where an airbag is disabled to be activated or in an ON state where the airbag is enabled to be activated.

BACKGROUND OF THE INVENTION

Conventionally, an occupant detection system for vehicle is known in the art. One system includes a mat shaped electrostatic sensor and an electronic control unit (ECU). The electrostatic sensor may be also referred to as a capacitive sensor. The electrostatic sensor is responsive to a turbulence of a weak electric field which is generated between a main electrode arranged inside a seat and a body member of the vehicle, and is arranged to output the turbulence in a current form or a voltage form. One example is disclosed in JP H11-271463A.

For example, if a seat is vacancy, only air is supplied between the electrodes of the electrostatic sensor. In another example, if a child restraint system (CRS), such as a junior restraint device, a child seat etc. is placed on the seat, CRS or CRS with a child is interposed between the electrodes. Further, if an adult human is on the seat, a large human body is interposed between the electrodes.

Here, the relative dielectric constant of air is about 1.0. The relative dielectric constant of CRS is in a range from about 2.0 to about 5.0. The value varies depending on material of CRS. The relative dielectric constant of a human body is about 50.0. Thus, the relative dielectric constants of air, CRS, and a human body differ, respectively. Therefore, the electrostatic capacity between the electrodes of the electrostatic sensor is changed according to the interposed objects.

The electrostatic sensor is responsive to a turbulence of a weak electric field caused by the difference of the electrostatic capacity. The electrostatic sensor outputs the turbulence in a current form or a voltage form. Then, the ECU performs an occupant determination based on the output. That is, the ECU determines whether the seat is vacancy, the seat is occupied with CRS, or the seat is occupied with an adult. The ECU performs a determination between a disablement and an enablement of activation of the occupant protection device. For example, the ECU determines whether an airbag should be disabled, prohibited, to deploy even if a certain level of collision is detected, or the airbag should be enabled, permitted, to deploy in response to a collision.

In detail, the ECU determines an OFF state where the airbag is disabled, when the seat is vacancy or the seat is occupied with CRS. On the other hand, the ECU determines an ON state where the airbag is enabled, when an adult sits down on the seat. The determination is based on a comparison between a detected value of the capacitance and a threshold value for discriminating the ON state and the OFF state. For example, the ON state is determined when the detected capacitance is equal to or less than the threshold value. The OFF state is determined when the detected capacitance exceeds the threshold value. The ECU may turn on an airbag ON indicator at the ON state, and turns on an airbag OFF indicator at the OFF state.

SUMMARY OF THE INVENTION

In the conventional occupant detection system, the sensor is highly sensitive also to external disturbances, and outputs noise. Therefore, the ECU may temporarily reverses the determination result in response to noises. For example, if a passenger touches the CRS when the CRS is mounted on the seat and the ECU determines the OFF state appropriately, the detected capacitance may be fluctuated in response to touching the CRS. If the capacitance is increased enough to cross the threshold value, the ECU reverses the determination result from the OFF state to the ON state temporarily. On the other hand, if a passenger moves his or her body to a slightly lifted condition on the seat when the seat is occupied with the passenger and the ECU determines the ON state, the detected capacitance may be fluctuated in response to movement of the body. If the capacitance is decreased enough to cross the threshold, the ECU reverses the determination result from the ON state to the OFF state temporarily.

It is an object of the present invention to provide an improved occupant detection system.

It is another object of the present invention to suppress a temporary reversal of the determination result in the occupant detection system which uses a capacitive sensor.

According to an aspect of the present invention, the invention provides an occupant detection system which includes a capacitive sensor arranged on the seat, and a determination block which determines whether it is in an OFF state where an occupant protecting device is disabled or in an ON state where the occupant protecting device is enabled based on a comparison between a detected value of the capacitive sensor and a predetermined threshold value. The occupant detection system includes an evaluation block which evaluates whether the determination result in the determination block is appropriate or not. The occupant detection system further includes a correction block which biases the determination block so as to suppress a reversal determination from the determination result which is evaluated as appropriate by the evaluation block. According to the invention, temporary reversal of the determination result is suppressed. The evaluation block evaluates whether the determination result is appropriate to show actual condition on the seat.

The evaluation block may be configured to evaluate whether an initial determination result determined by the determination block is appropriate or not. The initial determination result is a result determined in an early stage after starting a determination. It is possible to adjust the determination block to be apt to maintain the initial determination result which is evaluated as appropriate. It is possible to suppress undesirable reversal from the initial determination result.

The correction block may be configured to give bias to the determination block so as to reduce frequency of temporary reversal of the determination result, when the determination result is evaluated as appropriate. It is possible to reduce temporary reversal of the determination result. The correction block may be configured to give bias to the threshold value in the determination block. As a result, when the determination result is evaluated as appropriate, an adjustable hysteresis characteristic is provided in the determination block which adjusts the determination block to be apt to maintain the appropriate determination result.

The evaluation block may be configured to detect a temporary reversal of the determination result, then, to evaluate whether the determination result determined before the temporary reversal is detected is appropriate or not. The evaluation block may be configured to evaluate the determination result based on a behavior of the detected value. The evaluation block may be configured to evaluate that the determination result is appropriate, when a ratio of time of the determination result within a predetermined time period exceeds a predetermined ratio. It is possible to evaluate an appropriateness of the determination result, even in a condition where temporary reversal may occur. The evaluation block may be configured to evaluate that the determination result is appropriate, when duration of the determination result exceeds a predetermined time period. It is possible to evaluate an appropriateness of the determination result, even in a condition where temporary reversal may occur.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

A plurality of embodiments of the present invention are described in detail referring to the attached drawings. In the following description and drawings, the same reference numbers and symbols are given to components and parts which are the same or similar to that already described in the preceding embodiments. The preceding description may be referenced to for the components and parts denoted by the same reference numbers and symbols.

First Embodiment

Figure 1:
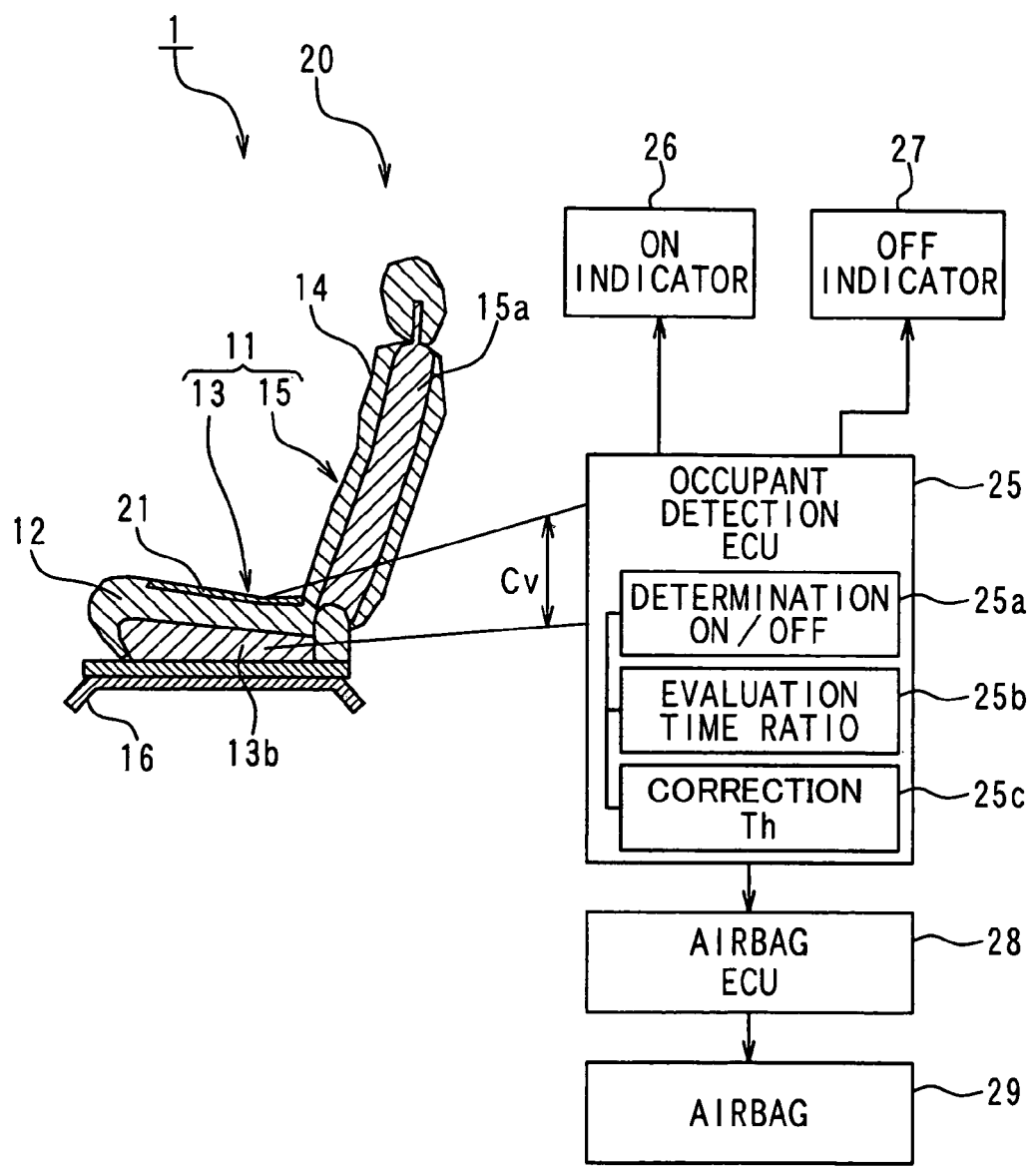
FIG. 1 is a block diagram showing a configuration of an occupant detection system according to a first embodiment of the present invention.

FIG. 1 is a block diagram showing a configuration of an occupant detection system according to a first embodiment of the present invention. The occupant detection system 20 is a part of an airbag system 1 mounted on a vehicle as an occupant protecting device.

Referring to FIG. 1, a seat 11 is mounted on a vehicle. The seat 11 includes a seat part 13 which has a seat cushion 12 where a passenger sits, and a backrest part 15 which has a back cushion 14 where a passenger leans. The bottom of the seat part 13 is equipped with a seat frame 13a which is electrically connected with a body 16 of the vehicle. The body 16 provides a member for providing an electrical ground level on the vehicle. The backrest part 15 is equipped with a back frame 15a which is electrically connected with the body 16. Therefore, the seat frame 13a and the back frame 15a are electrically connected with the ground potential on the vehicle.

The airbag system 1 is provided with the occupant detection system 20, an airbag ECU 28, and an airbag 29. The airbag ECU 28 controls deployment of the airbag 29 so that occupant protection is provided appropriately according to the signal from the occupant detection system 20. For example, the airbag ECU 28 permits deployment of the airbag 29, only when an occupant is detected on the seat 11. The airbag ECU 28 prohibits deployment of the airbag 29, when it is not detected an occupant which is able to be protected by the airbag 29. The airbag system 1 provides a smart airbag system.

The occupant detection system 20 is provided with a capacitive sensor 21, an occupant detection ECU 25, an airbag ON indicator 26, and an airbag OFF indicator 27. The capacitive sensor 21 is responsive and detects a capacitance around the seat 11 indicative of existence of occupant on the seat 11 or vacancy of the seat 11. The capacitive sensor 21 includes an electrode disposed on an upper part of the seat cushion 12. At least the seat frame 13a provides the other one of electrodes for the capacitive sensor 21. The occupant detection ECU 25 is operatively connected with the capacitive sensor 21 and the seat frame 13a. The occupant detection ECU 25 provides a determination block 25a, an evaluation block 25b, and a correction block 25c. The evaluation block 25b includes a time ratio calculating means which calculates a time ratio of at least one of the ON state and the OFF state. The evaluation block 25b includes a time ratio comparing means which compares the calculated time ratio with a predetermined threshold ratio in order to determine whether the determined result has a sufficient probability or not. The evaluation block 25b may be referred to as a time ratio acquisition block. The correction block 25c includes a threshold value changing means which changes the threshold value according to the time ratio calculated in the time ratio calculating means. The correction block 25c may be referred to as a threshold changing block. The occupant detection ECU 25 is operatively connected with the airbag ON indicator 26 and the airbag OFF indicator 27.

The capacitive sensor 21 and a capacitive type detecting method for object, such as the CRS and a passenger, performed by the occupant detection ECU 25 is explained. The occupant detection ECU 25 applies an AC voltage with the sine-wave of predetermined frequency to both electrodes of the capacitive sensor 21. As a result, a weak electric field is generated between the pair of electrodes of the capacitive sensor 21. It is possible to imagine lines of electric force between the electrodes. The lines of electric force are changed according to an object placed on the seat 11. For example, the lines of electric force get turbulence, if a human sits on the seat 11. The occupant detection ECU 25 detects change of a current or voltage according to the change or the turbulence of the lines of electric force. The turbulence of the lines of electric force is changed according to whether the seat 11 is vacancy, the seat 11 is occupied with the CRS etc, or the seat 11 is occupied with an adult human. In detail, the occupant detection ECU 25 detects a capacitance obtained from the capacitive sensor 21.

Therefore, the occupant detection ECU 25 can distinguish whether the seat 11 is vacancy, the seat 11 is occupied with the CRS, or the seat 11 is occupied with an adult human based on the detected current value or voltage value. In other words, the occupant detection ECU 25 distinguishes whether the seat 11 is vacancy, the seat 11 is occupied with the CRS, or the seat 11 is occupied with an adult human based on the capacitance of the object detected by the capacitive sensor 21. The occupant detection ECU 25 provides a determination block which determines whether a present condition on the seat 11 is in any one of at least two conditions. The determination block discriminates at least two conditions, one is a condition where the seat 11 is occupied with an object which is appropriate for being protected by the airbag 29, and the other one is a condition where the seat 11 is occupied with an object which is not appropriate for being protected by the airbag 29 or is adversely affected by the airbag 29. The determination block determines whether it is in a condition where deployment of the airbag is permissible or a condition where deployment of the airbag should be forbidden.

The determination block 25a determines whether deployment of the airbag is permitted, or deployment of the airbag is prohibited. The determination block 25a determines whether the condition on the seat 11 is an ON state where deployment of the airbag is permitted or the condition on the seat 11 is an OFF state where deployment of the airbag is prohibited. The determination result of the determination block 25a is referred to as the ON state and the OFF state. The determination block 25a determines the OFF state, when the seat 11 is vacancy or the seat 11 is occupied with the CRS. The determination block 25a determines the ON state, when the seat 11 is occupied with an adult human which is appropriate to be protected by the airbag. The determination block 25a determines the OFF state, when the detected value of capacitance is equal to or less than a threshold value Th. The determination block 25a determines the ON state, when the detected value of capacitance is higher than the threshold value Th. That is, the determination block 25a compares a detected value Cv indicative of condition on the seat 11 and the threshold value Th for discriminating the condition on the seat 11 into two conditions. In other words, the determination block 25a determines whether the detected value Cv is greater than or less than the threshold value Th at least.

The evaluation block 25b evaluates whether the determination result of the determination block 25a is appropriate or not. In other words, it is possible to express that the evaluation block 25b evaluates whether the threshold value Th is appropriate or not for suppressing frequent reversal determinations. The determination result to be evaluated in the evaluation block 25b may be an initial determination result. The initial determination result is a result determined in an early stage after the determination block starts an operation of determination. The determination result to be evaluated may be referred to as a provisional determination result. The evaluation block may be configured to evaluate that the initial determination result is appropriate, when a ratio of time of the initial determination result within a predetermined time period exceeds a predetermined ratio. The evaluation block evaluates the correctness of the initial determination result, when the reversal from the initial determination result occurs. The evaluation block evaluates whether the initial determination result is appropriate based on a share of the initial determination result in a time period where at least one of reversal of determination occurs. The evaluation block 25b further determines whether the time ratio of the ON state and the OFF state determined by the determination block 25a exceeds a predetermined upper ratio or is less than a predetermined lower ratio. In detail, the evaluation block 25b calculates both the time ratio R(ON/Ta) of the ON state, and the time ratio R(OFF/Ta) of the OFF state. The evaluation block 25b determines whether the time ratio of the ON state is equal to or more than a predetermined threshold ratio. The evaluation block 25b also determines whether the time ratio of the OFF state is equal to or more than a predetermined threshold ratio. Therefore, the evaluation block 25b provides means for calculating the time ratio and means for comparing the time ratio with the predetermined threshold ratio.

Figure 2:
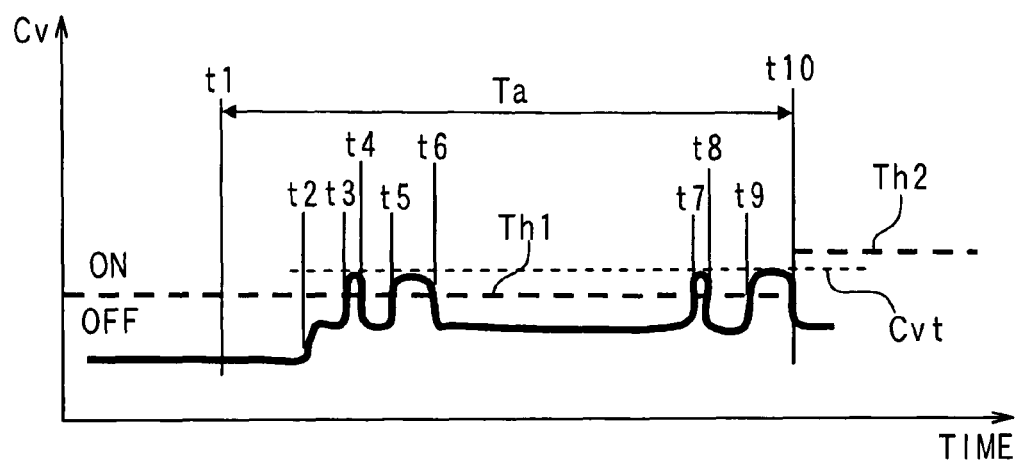
FIG. 2 is a graph showing a relationship between a detected value and a threshold value according to the first embodiment.

The evaluation block 25b calculates a time ratio of the OFF state within a predetermined time period, when a first condition is satisfied. The first condition is that the OFF state is determined at the first determination after the occupant detection ECU 25 starts operation. The predetermined time period is a time period Ta after the occupant detection ECU 25 starts operation. An example is shown in FIG. 2. The occupant detection ECU 25 starts operation at the time t1, and is available for determining the ON or OFF state. The first determination after the time t1 is the OFF state. In this example, the CRS with a child is mounted on the seat 11. The first determination result is obtained in the time t2. In each period between the time t3 and t4, the time t5 and t6, the time t7 and t8, and the time t9 and t10, the detected value, i.e., the capacitance Cv, is increased temporarily by noise. A noise may be generated according to disturbance, such as that a passenger touches the CRS, for example. Therefore, a plurality of ON state are determined during the time period Ta. The evaluation block 25b calculates the time ratio R(OFF/Ta) of the OFF state within the time period Ta. The evaluation block 25b evaluates whether the initial determination result is appropriate or not by determining whether the time ratio R(OFF/Ta) of the OFF state is equal to or more than the predetermined threshold ratio Rt1. In a case that the time ratio R(OFF/Ta) is considered great, a reversal frequency from the initial determination result is considered low. In this case, since it is possible to consider that the initial determination result has sufficient probability, it can be evaluated that the initial determination result is appropriate. In other words, it can be evaluated that the initial threshold value Th1 is too close to the detected value Cv, i.e., inappropriate for suppressing frequent reversal. Then, the evaluation block 25b gives a feedback bias to the determination block 25a so that temporary reversal frequency is further reduced.

The correction block 25c corrects the threshold value Th which is used for determining whether the ON state or the OFF state in the determination block 25a. The correction block 25c corrects the threshold value increasingly to a predetermined value, when the time ratio R(OFF/Ta) of the OFF state calculated in the evaluation block 25b is equal to or more than the predetermined threshold ratio Rt1. In the example of FIG. 2, the threshold value Th is increased from an initial value Th1 to a corrected value Th2 at the time t10. The ascending amount of this threshold value Th is predetermined based on a margin of capacitance increase produced by being touched the CRS with a passenger, for example. In the example, the corrected threshold value Th2 after the ascending correction is predetermined higher than the capacitance Cvt increased according to disturbance. For example, the capacitance Cvt may be obtained as a peak value of the capacitance Cv observed during the predetermined time period Ta.

Figure 3:
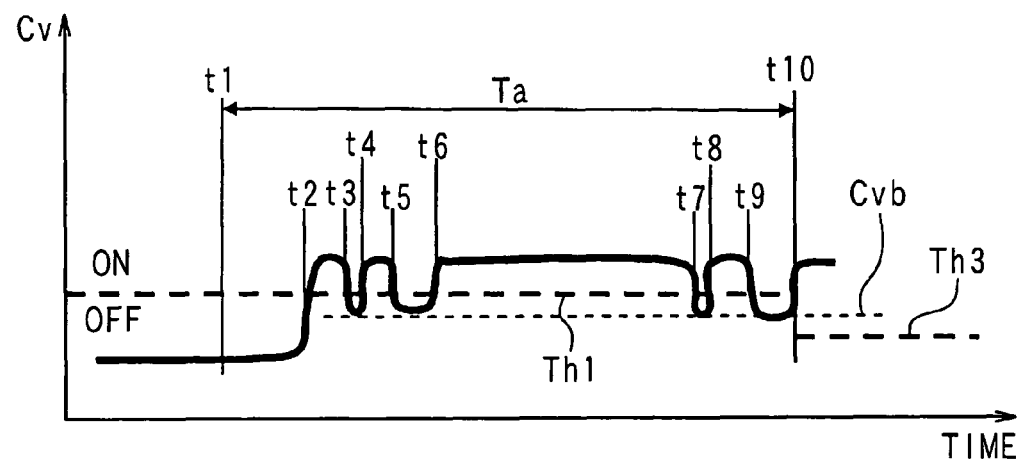
FIG. 3 is a graph showing a relationship between a detected value and a threshold value according to the first embodiment.

The evaluation block 25b calculates the ratio of the ON state within a predetermined time period, when a second condition is satisfied. The second condition is that the ON state is determined at the first determination after the occupant detection ECU 25 starts operation. The predetermined time period is the time period Ta after the occupant detection ECU 25 starts operation. An example is shown in FIG. 3. The occupant detection ECU 25 starts operation at the time t1, and is available for determining the ON or OFF state. The first determination after the time t1 is the ON state. In the time t2, a passenger sits on the seat 11. The first determination result is obtained in the time t2. In each period between the time t3 and t4, the time t5 and t6, the time t7 and t8, and the time t9 and t10, the detected value, i.e., the capacitance Cv, is decreased temporarily by noise. A noise may be generated according to temporary disturbance. For example, if a passenger sitting on the seat 11 moves his or her body in a slightly lifted condition, the capacitance is fluctuated according to the movement of the body. Therefore, a plurality of OFF state are determined during the time period Ta. The evaluation block 25*b* calculates the time ratio R(ON/Ta) of the ON state within the time period Ta. The evaluation block 25*b* evaluates whether the initial determination result is appropriate or not by determining whether the time ratio R(ON/Ta) of the ON state is equal to or more than the predetermined threshold ratio Rt2. In a case that the time ratio R(ON/Ta) is considered great, a reversal frequency from the initial determination result is considered low. In this case, since it is possible to consider that the initial determination result has sufficient probability, it can be evaluated that the initial determination result is appropriate. In other words, it can be evaluated that the initial threshold value Th1 is too close to the detected value Cv, i.e., inappropriate for suppressing frequent reversal. Then, the evaluation block 25*b* gives a feedback bias to the determination block 25*a* so that temporary reversal frequency is further reduced.

The correction block 25*c* corrects the threshold value Th for determining whether the ON state or the OFF state in the determination block 25*a*. The correction block 25*c* corrects the threshold value decreasingly to a predetermined value, when the time ratio R(ON/Ta) of the ON state calculated in the evaluation block 25*b* is equal to or more than the predetermined threshold ratio Rt2. In the example of FIG. 3, the threshold value Th is decreased from the initial value Th1 to a corrected value Th3 at the time t10. The descending amount of this threshold value Th is predetermined based on a margin of capacitance decrease produced by movement of a human body, for example. In the example, the corrected threshold value Th3 after the descending correction is predetermined lower than the capacitance Cvb decreased according to disturbance. For example, the capacitance Cvb may be obtained as a bottom value of the capacitance Cv observed during the predetermined time period Ta.

According to the embodiment, the threshold value is adjusted to an appropriate value during the time period Ta after the occupant detection ECU 25 starts operation by the evaluation block 25*b* and the correction block 25*c*. In other words, the threshold value is adjusted according to the condition on the seat 11 at the beginning of operation of vehicle.

The evaluation block 25*b* and the correction block 25*c* provide a section which corrects the threshold value. The correction block 25*c* gives bias to the determination block 25*a* so that the determination block 25*a* is apt to maintain the initial determination result, i.e., so that the determination block 25*a* avoids reversal of the determination result. The correction block 25*c* biases the determination block 25*a* so that the frequency of temporary reversal of the determination result is reduced. This bias is given to separate and widen a distance between the average value of the detected value and the threshold value. For example, the threshold value is shifted by giving bias to the threshold value. The shift amount of the threshold value in the correction block 25*c* is set so that a deviation of the detected value caused by noise is masked behind the threshold value. In detail, the shift amount of the threshold value is set so that the noise component Cvt or Cvb after the initial determination is masked. In other words, it can be said that the correction block 25*c* corrects the threshold value Th to widen a distance from the average value of the detected value Cv so that frequent reversal of the determination result is suppressed.

The occupant detection ECU 25 turns on the airbag ON indicator 26 during the ON state. The occupant detection ECU 25 turns on the airbag OFF indicator 27 during the OFF state. The occupant detection ECU 25 outputs a signal indicative of the ON state and the OFF state to the airbag ECU 28. As a result, when the airbag ON indicator 26 is turned on, the airbag 29 may be deployed by the airbag ECU 28 in response to a collision of the vehicle. On the other hand, when the airbag OFF indicator 27 is turned on, the airbag 29 will not be developed even in a collision of the vehicle.

Figure 4:
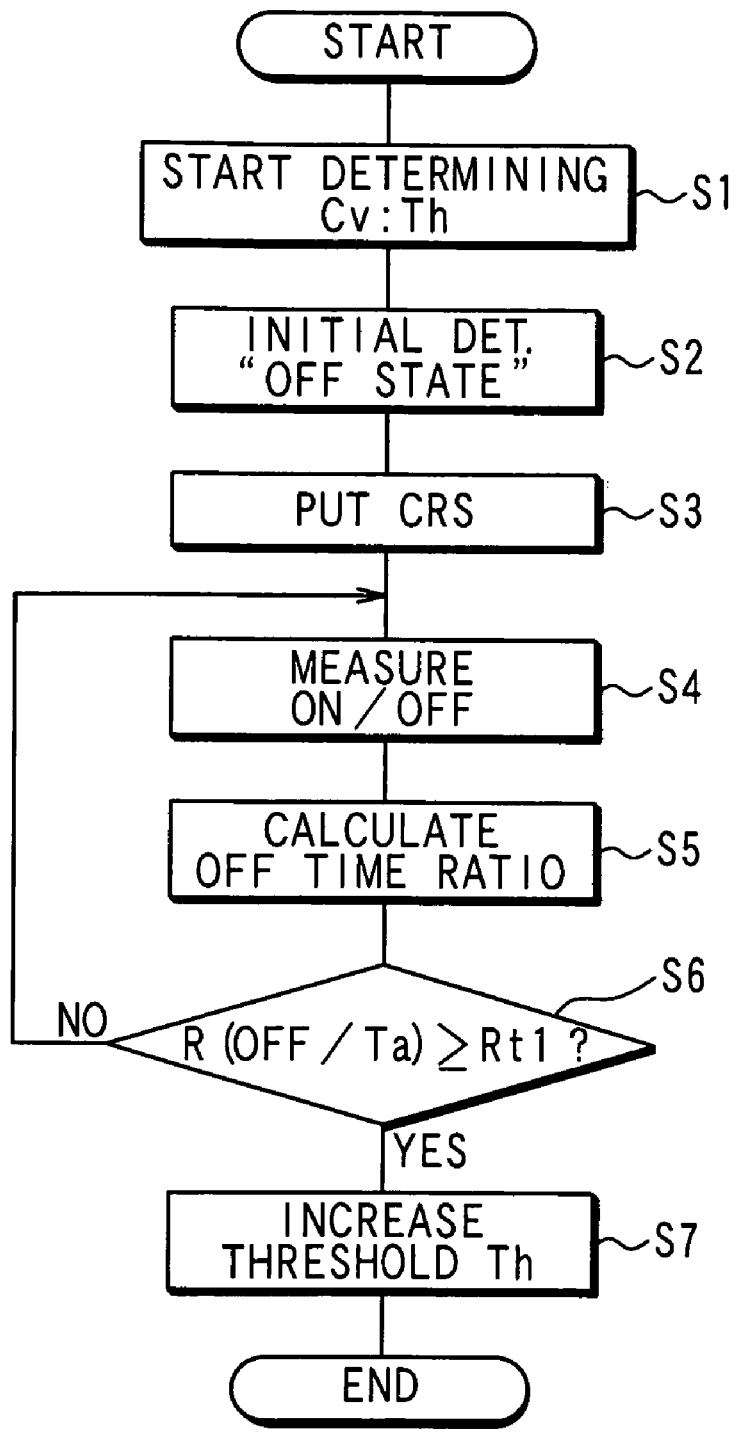
FIG. 4 is a flow chart showing an example of transition according to the first embodiment.
Figure 5:
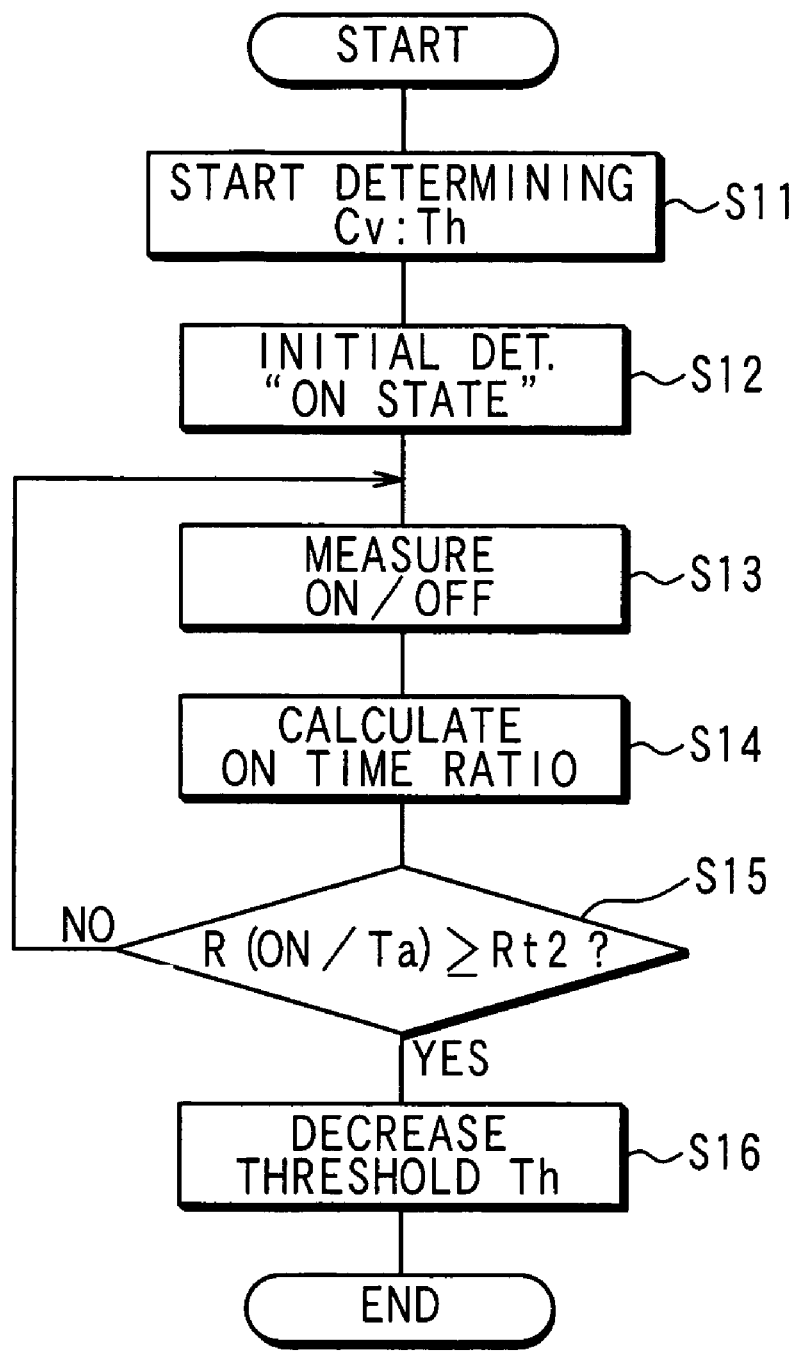
FIG. 5 is a flow chart showing an example of transition according to the first embodiment.

Operation of the occupant detection system 20 is explained with reference to the flow charts shown in FIG. 4 and FIG. 5. FIG. 4 and FIG. 5 show examples of transitions of condition in the occupant detection system 20. FIG. 4 and FIG. 5 include operational steps executed by the occupant detection ECU 25.

First, FIG. 2 and FIG. 4 explain a case where the initial determination result is the OFF state. In a step S1, the system starts operation in response to a supply of a power source. The time t1 in FIG. 2 corresponds to the step S1. Then, the occupant detection ECU 25 starts operation and the determination block 25*a* becomes available to determine the states. In a step S2, it is determined that the seat 11 is vacancy, i.e., the OFF state. Next, it is assumed that the CRS with a child is mounted on the seat 11. The CRS is mounted in a step S3. The time t2 in FIG. 2 corresponds to the step S3. As shown in FIG. 2, the detected value Cv increases in response to installation of the CRS. However, since the first threshold value Th1 in the early stage of operation is set appropriately, the first determination result is maintained at the OFF state. The determination result obtained from the steps S1 through S3 is the initial determination result. In the example of FIG. 4, the initial determination result is the OFF state.

Then, if the detected value Cv goes up more than the threshold value Th1 by a noise, the determination result in the determination block 25*a* is reversed from the OFF state to the ON state. The ON state is detected by the evaluation block 25*b*. The ON state is detected in a step S4. Therefore, in a case that the initial determination result is the OFF state, a temporary reversal to the ON state is detected. Further, in the step S4, a time period of the ON state and/or a time period of the OFF state is calculated by accumulating time. In each period between the time t3 and t4, the time t5 and t6, the time t7 and t8, and the time t9 and t10 in FIG. 2, the detected value, i.e., the capacitance Cv, is temporarily increased higher than the threshold value by noise.

In a step S5, the time ratio R(OFF/Ta) which is a ratio of an accumulated time of the OFF state within the predetermined time period Ta is calculated. The predetermined time Ta is the time from the time t1 to the time t10 in FIG. 2. The accumulated time of the OFF state may be obtained by subtracting the accumulated time of the ON state from the predetermined time Ta. In a step S6, it is determined that whether the time ratio R(OFF/Ta) is equal to or higher than the predetermined threshold ratio Rt1 or not. The processing of steps S4 through S6 is repeated till the time t10 in FIG. 2.

If the time ratio R(OFF/Ta) is less than the predetermined threshold ratio Rt1, the routine returns to the step S4. On the other hand, if the time ratio R(OFF/Ta) is equal to or higher than the predetermined threshold ratio Rt1, the routine advances to a step S7. The threshold value Th is increased in the step S7. The ascending amounts of the threshold value Th is set greater than the ascending amount of the detected value Cv caused by a passenger touching the CRS. For example, the threshold value Th2 is set higher than the top values Cvt of the detected value Cv during the predetermined time Ta. After the threshold value Th is corrected and updated, even if a passenger touches the CRS and the detected value Cv increases, the determination result is maintained at the OFF state. Therefore, it is possible to avoid a temporary reversal of the determination result. In the example of FIG. 2, the threshold value Th is increased from the initial threshold value Th1 to the corrected threshold value Th2 at the time t10. In other words, in a case that a temporary reversal to the ON state is detected when the initial determination result is the OFF state, the threshold value Th is corrected increasingly.

Next, FIG. 3 and FIG. 5 explain a case where the initial determination result is the ON state. A step S11 is the same as the step S1. The ON state is determined in a step S12. For example, a passenger sits down on the seat 11, a step S12 is realized. The step S12 corresponds to the time t2 in FIG. 3. As shown in FIG. 3, at this time, the detected value Cv slightly exceeds the initial threshold value Th1. The detected value Cv depends on the size etc. of those who sits down on the seat 11. The determination result obtained from the steps S11 through S12 is the initial determination result. In the example of FIG. 5, the initial determination result is the ON state.

Then, if the detected value Cv goes down less than the threshold value Th1 by a noise, the determination result in the determination block 25a is reversed from the ON state to the OFF state. The OFF state is detected by the evaluation block 25b. The OFF state is detected in a step S13. Therefore, in a case that the initial determination result is the ON state, a temporary reversal to the OFF state is detected. Further, in the step S13, a time period of the ON state and/or a time period of the OFF state is calculated by accumulating time. In each period between the time t3 and t4, the time t5 and t6, the time t7 and t8, and the time t9 and t10 in FIG. 3, the detected value, i.e., the capacitance Cv, is temporarily decreased lower than the threshold value Th1 by noise.

In a step S14, the time ratio R(ON/Ta) which is a ratio of an accumulated time of the ON state within the predetermined time period Ta is calculated. The predetermined time Ta is the time from the time t1 to the time t10 in FIG. 3. The accumulated time of the ON state may be obtained by subtracting the accumulated time of the OFF state from the predetermined time Ta. In a step S15, it is determined that whether the time ratio R(ON/Ta) is equal to or higher than the predetermined threshold ratio Rt2 or not. The predetermined threshold ratios Rt1 and Rt2 may have the same value or different values. The processing of steps S13 through S15 is repeated till the time t10 in FIG. 3.

If the time ratio R(ON/Ta) is less than the predetermined threshold ratio Rt2, the routine returns to the step S13. On the other hand, if the time ratio R(ON/Ta) is equal to or higher than the predetermined threshold ratio Rt2, the routine advances to a step S16. The threshold value Th is decreased in the step S16. The descending amounts of the threshold value Th is set greater than the descending amount of the detected value Cv caused by movement of a human body. For example, the threshold value Th2 is set lower than the bottom values Cvb of the detected value Cv during the predetermined time Ta. After the threshold value Th is corrected and updated, even if a passenger moves his or her body slightly and the detected value Cv decreases, the determination result is maintained at the ON state. Therefore, it is possible to avoid a temporary reversal of the determination result. In the example of FIG. 3, the threshold value Th is decreased from the initial threshold value Th1 to the corrected threshold value Th3 at the time t10. In other words, in a case that a temporary reversal to the OFF state is detected when the initial determination result is the ON state, the threshold value Th is corrected decreasingly.

The determination block 25a performs the determining process continuously for both flows in FIG. 4 and FIG. 5. The evaluation block 25b provides the steps S4, S5, S6, S13, S14, and S15. The correction block 25c provides the steps S7 and S16. In the embodiment, if a temporary reversal of the determination result is detected, a bias is given to the determination block by correcting the threshold value Th so that the frequency of temporary reversal is reduced. The temporary reversal can be detected by detecting a reversal from the initial determination result, and evaluating that the initial determination result has sufficient reliability and probability. The detecting means for detecting the reversal from the initial determination result is provided by the step S4 or S13. The evaluating means for evaluating the reliability and probability of the initial determination result is provided by the step S6 or S15.

The occupant detection system 20 is provided with the capacitive sensor 21 which generates a weak electric field between the electrode arranged inside the seat 11 and the member maintained at the ground potential level of the vehicle, and outputs a signal in the current form or voltage form according to a magnitude or change of the weak electric field. The occupant detection system 20 is also provided with the occupant detection ECU 25 which determines the ON state where the airbag is enabled to be activated or the OFF state where the airbag is disabled to be activated. The occupant detection ECU 25 determines that the seat 11 is vacancy or mounted with the CRS when the detected value of the capacitive sensor 21 is less than the predetermined threshold value, and determines the OFF state. The occupant detection ECU 25 determines that the seat 11 is occupied with a passenger when the detected value of the capacitive sensor 21 is equal to or higher than the predetermined threshold value, and determines the ON state.

The occupant detection ECU 25 is provided with a time rate acquisition part 25b and a threshold value change part 25c. The time ratio acquisition part 25b acquires the time ratios of the OFF state and the ON state within the predetermined time period. The threshold value change part 25c changes the threshold value to a predetermined value according to the ratio calculated by the time ratio acquisition part 25b.

In detail, the threshold value change part 25c increases the threshold value to a predetermined value, when the time ratio of the OFF state is equal to or higher than the predetermined ratio. The threshold value change part 25c decreases the threshold value to a predetermined value, when the time ratio of the ON state is equal to or higher than the predetermined ratio. Thus, the threshold value change part 25c carries out both an increasing correction and a decreasing correction for the threshold value Th.

As a result, if the time ratio of the OFF state is equal to or higher than the predetermined ratio, the threshold value Th is increased up to the predetermined value Th2 at the time t10. Therefore, for example, even if the capacitance is increased by a passenger touching the CRS on the seat 11 after the threshold value is increased, the determination result is maintained at the OFF state and is not easily reversed to the ON state. If the time ratio of the ON state is equal to or higher than the predetermined ratio, the threshold value Th is decreased to the predetermined value Th3 at the time t10. Therefore, for example, even if the capacitance is decreased by movement of a passenger on the seat 11 after the threshold value is decreased, the determination result is maintained at the ON state and is not easily reversed to the OFF state. Therefore, it is possible to prevent a short time reversal determination to the ON state due to some factors, such as a noise, during the OFF state. Conversely, it is possible to prevent a short time reversal determination to the OFF state due to some factors, such as a noise, during the ON state.

Second Embodiment

Figure 6:
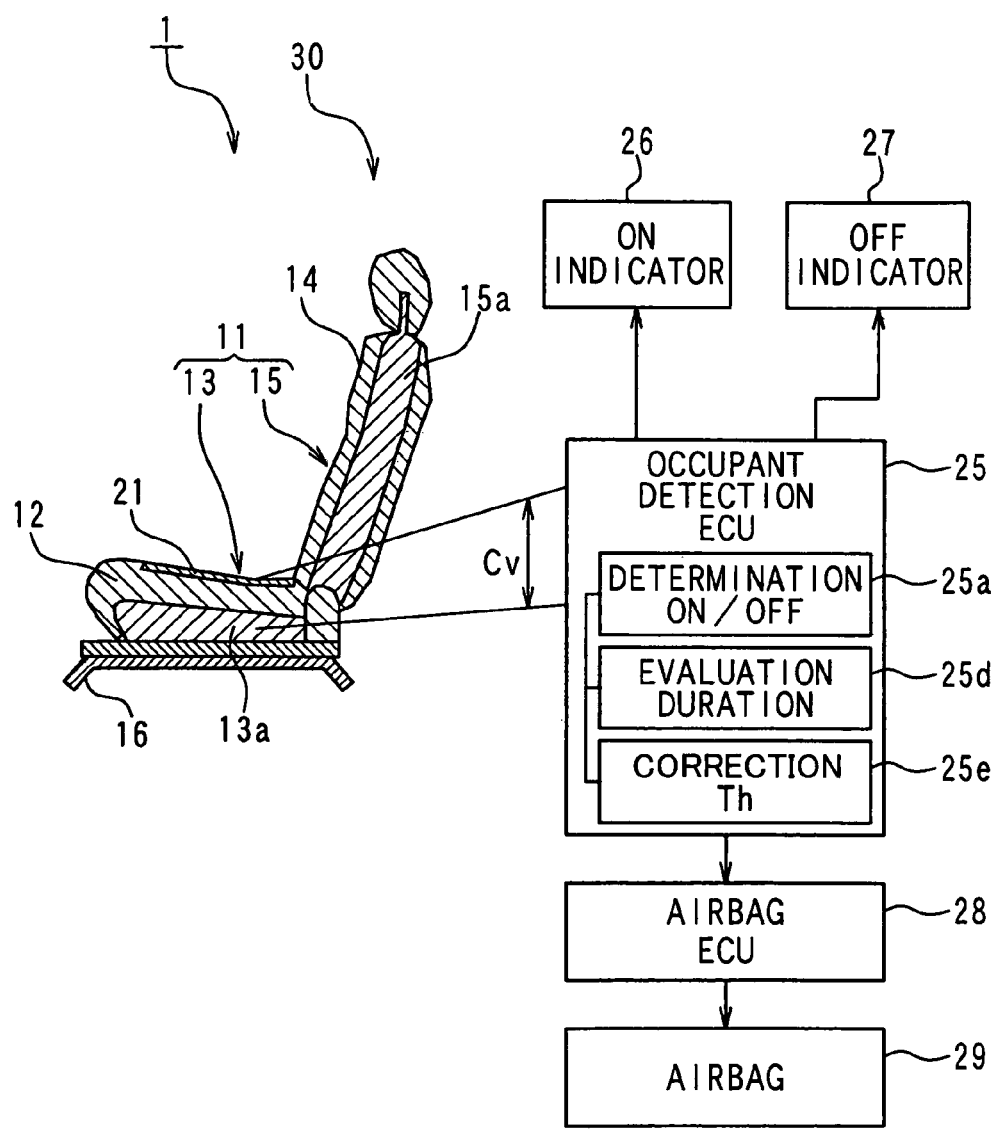
FIG. 6 is a block diagram showing a configuration of an occupant detection system according to a second embodiment of the present invention.

FIG. 6 is a block diagram showing a configuration of an occupant detection system according to a second embodiment of the present invention. The occupant detection system 30 shown in FIG. 6 is differentiated from the occupant detection system 20 shown in FIG. 1 at an evaluation block 25d and a correction block 25e in the occupant detection ECU 25.

The evaluation block 25d evaluates whether the determination result of the determination block 25a is appropriate or not. In other words, it is possible to express that the evaluation block 25d evaluates whether the threshold value Th is appropriate or not for suppressing frequent reversal determinations. The evaluation block 25d evaluates the correctness of the initial determination result, when the reversal from the initial determination result occurs. The evaluation block 25d evaluates whether the initial determination result is appropriate or not based on a continuing duration of the initial determination result in a time period where at least one of reversal of the determination occurs. The evaluation block 25d may also be referred to as a duration determination block which measures a continuing duration where the same determination result is maintained continuously, and determines whether the continuing duration of the determination result exceeds a predetermined time period. The evaluation block 25d may also be referred to as a continuing state determining means for determining whether the determination result, i.e., the detected value Cv, is in the first continuing state or in the second continuing state or not. The evaluation block 25d detects that the continuing duration of the ON state exceeds the predetermined time period, or that the continuing duration of the OFF state exceeds the predetermined time period. The correction block 25e may also be referred to as a threshold value changing means for changing the threshold value increasingly to a predetermined value, when the continuing state determining means determines that the first continuing state, and for changing the threshold value decreasingly to a predetermined value, when the continuing state determining means determines that the second continuing state.

In detail, the evaluation block 25d determines that the determination result, i.e., the detected value Cv, becomes a first continuing state. The first continuing state is detected when the following three conditions are met, (1) the initial determination result is the OFF state, (2) the determination result once reversed to the ON state temporarily and again returned to the OFF state, and (3) the returned OFF state is continuously determined for a predetermined time period Tb1. In other words, the first continuing state is that the determined result is continuously maintained for a predetermined time period in the returned OFF state, when the determination result is returned again to the returned OFF state from the ON state after the determined result once temporarily reversed from the OFF state to the ON state.

The correction block 25e increases the threshold value Th from the initial threshold value Th1 to the corrected threshold value Th2, when the first continuing state is detected. This threshold value Th2 is higher than the top values Cvt of the detected value Cv during a time period from the time t1 to the time t7.

Further, the evaluation block 25d determines that the determination result, i.e., the detected value Cv, becomes a second continuing state. The second continuing state is detected when the following three conditions are met, (1) the initial determination result is the ON state, (2) the determination result once reversed to the OFF state temporarily and again returned to the ON state, and (3) the returned ON state is continuously determined for a predetermined time period Tb2. In other words, the second continuing state is that the determined result is continuously maintained for a predetermined time period in a returned ON state, when the determination result is returned again to the returned ON state from the OFF state after the determined result once temporarily reversed from the ON state to the OFF state.

The correction block 25e decreases the threshold value Th from the initial threshold value Th1 to the corrected threshold value Th3, when the second continuing state is detected. The threshold value Th3 is lower than the bottom values Cvb of the detected value Cv during a time period from the time t1 to the time t7.

Figure 9:
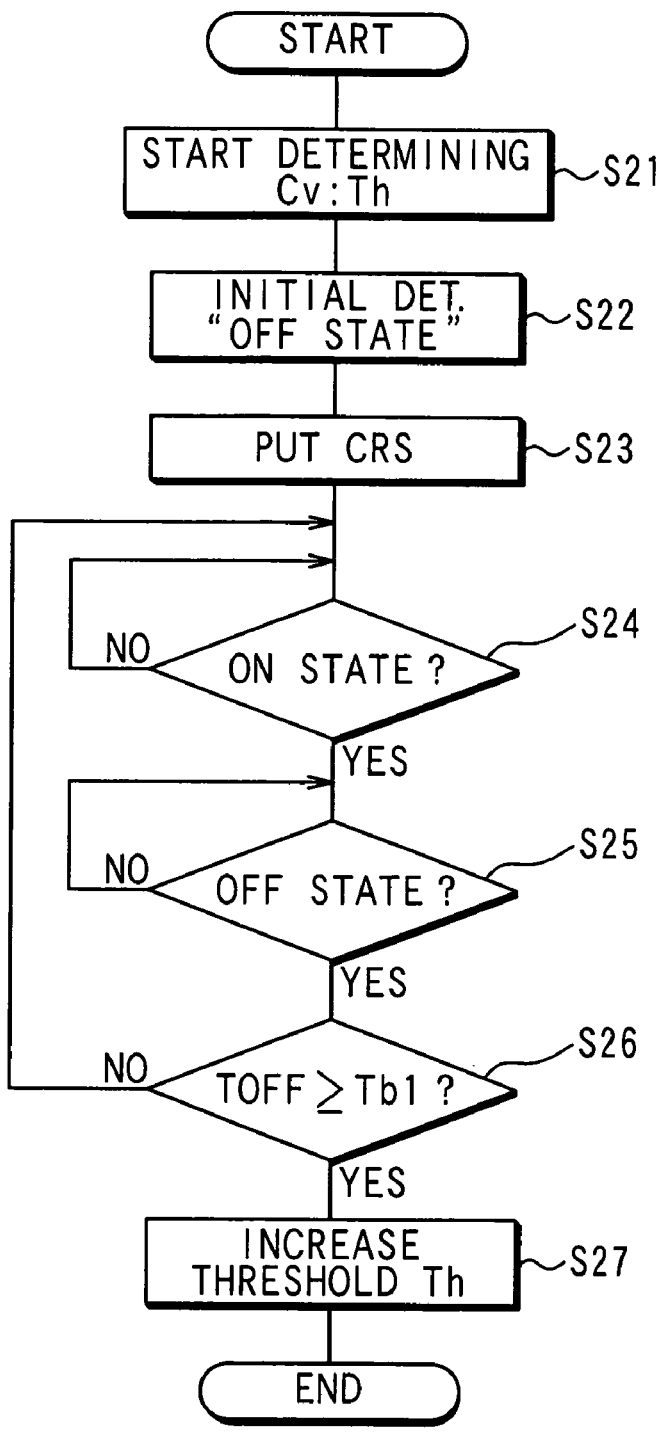
FIG. 9 is a flow chart showing an example of transition according to the second embodiment.
Figure 10:
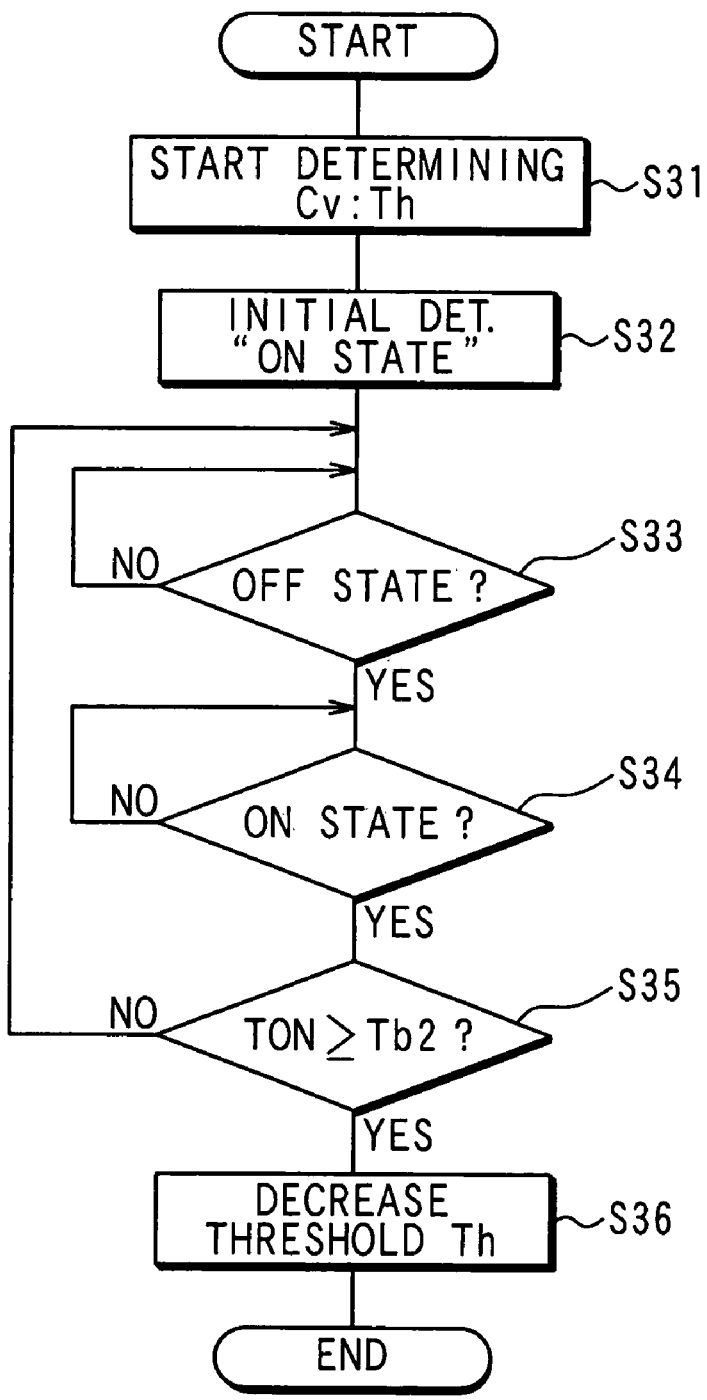
FIG. 10 is a flow chart showing an example of transition according to the second embodiment.

Operation of the occupant detection system 30 is explained with reference to the flow charts shown in FIG. 9 and FIG. 10. FIG. 9 and FIG. 10 show examples of transitions of condition in the occupant detection system 30. FIG. 9 and FIG. 10 include operational steps executed by the occupant detection ECU 25.

Figure 7:
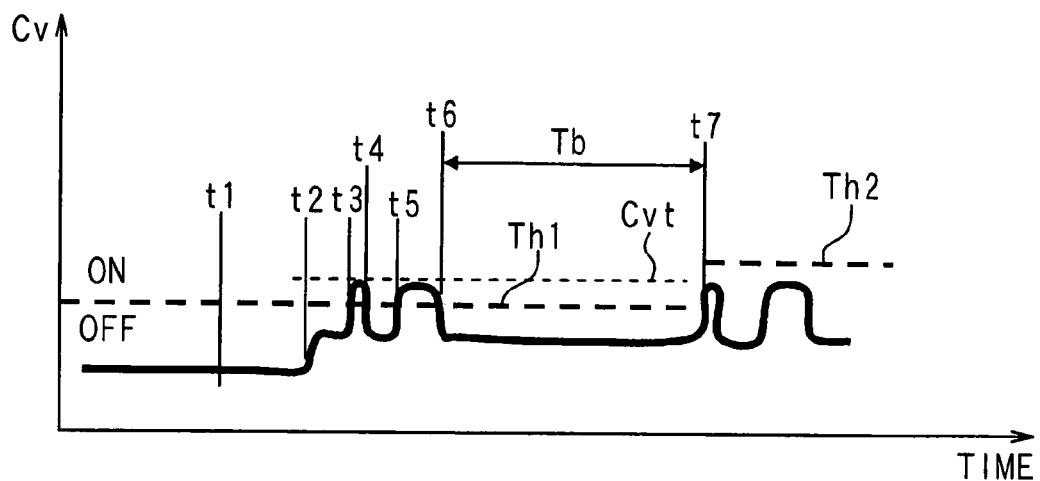
FIG. 7 is a graph showing a relationship between a detected value and a threshold value according to the second embodiment.

First, referring to FIG. 7 and FIG. 9, a case where the initial determination result is the OFF state is explained. A step S21 is the same as the step S1. A step S22 is the same as the step S2. A step S23 is the same as the step S3. As shown in FIG. 7, the detected value Cv goes up by mounting the CRS, but the detected value Cv does not exceed the initial threshold value Th1 preset for at least in an early stage. In S24, it is determined that whether the determination result is reversed from the OFF state to the ON state.

In a step S25, it is determined that whether the determination result is reversed from the ON state to the OFF state. A temporary reversal to the ON state is detected by processing in the steps S24 and S25. For example, a temporary reversal to the ON state is shown between the time t3 and t4 or between the time t5 and t6 in FIG. 7.

Next, in a step S26, it is determined that whether the OFF state is maintained continuously for a predetermined time period Tb1. In the step S26, the occupant detection ECU 25 measures a duration TOFF of the OFF state after a temporary reversal to the ON state was detected, and also compares the duration TOFF with the predetermined time period Tb1. If the OFF state is not maintained continuously for duration equal to or longer than the predetermined time period Tb1, the routine returns to the step S24. If the OFF state is maintained continuously for duration equal to or longer than the predetermined time period Tb1, it is determined that the detected value Cv is in the first continuing state, and the routine advances to a step S27.

In the example of FIG. 7, the duration TOFF of the OFF state between the time t4 and the time t5 does not exceed the predetermined time period Tb1. The duration TOFF of the OFF state after the time t6 exceeds the predetermined time period Tb1 at least before the time t7. A step S27 is the same as the step S7.

Figure 8:
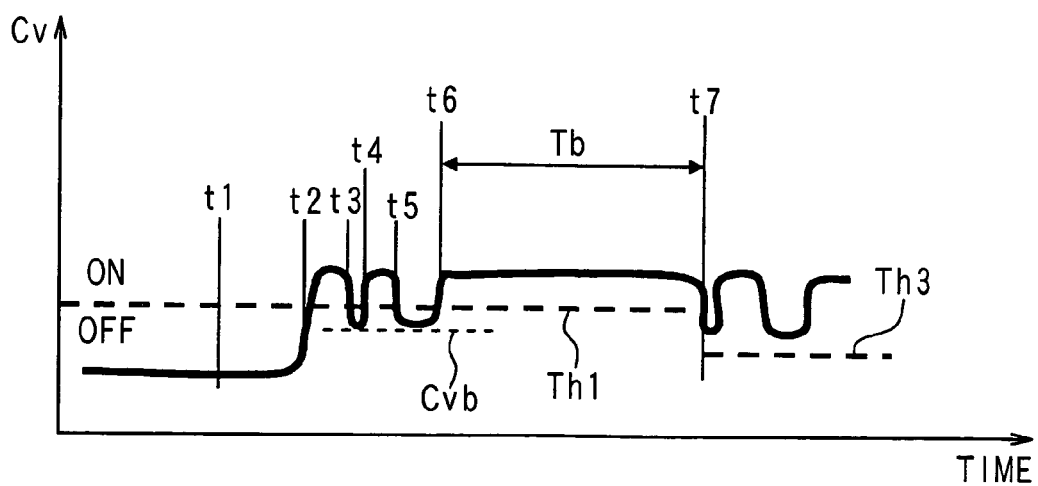
FIG. 8 is a graph showing a relationship between a detected value and a threshold value according to the second embodiment.

Next, referring to FIG. 8 and FIG. 10, a case where the initial determination result is the ON state is explained. A step S31 is the same as the step S11. A step S32 is the same as the step S12. A step S33 is the same as the step S25. A step S34 is the same as the step S24.

A temporary reversal to the OFF state is detected by processing in the steps S33 and S34. For example, a temporary reversal to the OFF state is shown between the time t3 and t4 or between the time t5 and t6 in FIG. 8.

Next, in a step S35, it is determined that whether the ON state is maintained continuously for a predetermined time period Tb2. In the step S35, the occupant detection ECU 25 measures a duration TON of the ON state after a temporary reversal to the OFF state was detected, and also compares the duration TON with the predetermined time period Tb2. If the ON state is not maintained continuously for duration equal to or longer than the predetermined time period Tb2, the routine returns to the step S33. If the ON state is maintained continuously for duration equal to or longer than the predetermined time period Tb2, it is determined that the detected value Cv is in the second continuing state, and the routine advances to a step S36.

In the example of FIG. 8, the duration TON of the ON state between the time t4 and the time t5 does not exceed the predetermined time period Tb2. The duration TON of the ON state after the time t6 exceeds the predetermined time period Tb2 at least before the time t7. A step S36 is the same as the step S16.

According to the occupant detection system 30 in the second embodiment, the system is configured to increase the threshold value to the predetermined value, when it is determined that the detected value Cv, i.e., the determination result, is in the first continuing state. As a result, it is possible to maintain the OFF state after the threshold value Th is corrected, even if the detected value Cv goes up temporarily.

In addition, the system is configured to decrease the threshold value to the predetermined value, when it is determined that the detected value Cv, i.e., the determination result, is in the second continuing state. As a result, it is possible to maintain the ON state after the threshold value Th is corrected, even if the detected value Cv goes down temporarily.

Other Embodiment

In the above-mentioned embodiments, the correction block 25c carries out both an increasing correction and a decreasing correction for the threshold value Th. However, the correction block 25c may carry out only either one of the increasing correction or the decreasing correction for the threshold value Th.

In the above-mentioned embodiment, although the threshold value is corrected, the detected value in the determination block may be corrected to give a certain amount of bias.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An occupant detection system comprising:
a capacitive sensor that generates a weak electric field between an electrode arranged inside a vehicle seat and a vehicle body, and that outputs current or voltage according to magnitude or change of the weak electric field; and
an electronic control unit that determines an OFF state when value of the current or voltage from the capacitive sensor is lower than a predetermined determination threshold, and that determines an ON state when the value of the current or voltage from the capacitive sensor exceeds the determination threshold, wherein the OFF state prohibits deployment of an air bag, wherein the ON state permits the deployment of the air bag,
wherein the electronic control unit includes:
an evaluation block that calculates a time ratio of the OFF state and the ON state within a predetermined time period, wherein the OFF state and the ON state are determined by the electronic control unit; and
a correction block that changes the determination threshold to a predetermined value according to the time ratio calculated by the evaluation block.

2. The occupant detection system according to claim 1, wherein
the correction block increases the determination threshold to the predetermined value when the time ratio of the OFF state, which is calculated by the evaluation block, is greater than or equal to a predetermined ratio.

3. The occupant detection system according to claim 1, wherein
the correction block decreases the determination threshold to the predetermined value when the time ratio of the ON state, which is calculated by the evaluation block, is greater than or equal to a predetermined ratio.

4. An occupant detection system comprising:
a capacitive sensor that generates a weak electric field between an electrode arranged inside a vehicle seat and a vehicle body, and that outputs current or voltage according to magnitude or change of the weak electric field; and
an electronic control unit that determines an OFF state when value of the current or voltage from the capacitive sensor is lower than a predetermined determination threshold, and that determines an ON state when the value of the current or voltage from the capacitive sensor exceeds the determination threshold, wherein the OFF state prohibits deployment of an air bag, wherein the ON state permits the deployment of the air bag,
wherein the electronic control unit includes:
an evaluation block that determines a continuing state when a determination result of the electronic control unit is changed from the OFF state to the ON state and then changed to the OFF state and then the OFF state is continuously maintained for a predetermined time period; and
a correction block that increases the determination threshold to a predetermined value when the evaluation block determines the continuing state.

5. An occupant detection system comprising:
a capacitive sensor that generates a weak electric field between an electrode arranged inside a vehicle seat and a vehicle body, and that outputs current or voltage according to magnitude or change of the weak electric field; and
an electronic control unit that determines an OFF state when value of the current or voltage from the capacitive sensor is lower than a predetermined determination threshold, and that determines an ON state when the value of the current or voltage from the capacitive sensor exceeds the determination threshold, wherein the OFF state prohibits deployment of an air bag, wherein the ON state permits the deployment of the air bag,
wherein the electronic control unit include:
an evaluation block that determines a continuing state when a determination result of the electronic control unit is changed from the ON state to the OFF state and then changed to the ON state and then the ON state is continuously maintained for a predetermined time period; and a correction block that decreases the determination threshold to a predetermined value when the evaluation block determines the continuing state.

6. An occupant detection system comprising:

a capacitive sensor that generates a weak electric field between an electrode arranged inside a vehicle seat and a vehicle body, and that outputs current or voltage according to magnitude or change of the weak electric field; and an electronic control unit that determines an OFF state when value of the current or voltage from the capacitive sensor is lower than a predetermined determination threshold, and that determines an ON state when the value exceeds the determination threshold, wherein the OFF state prohibits deployment of an air bag, wherein the ON state permits the deployment of the air bag, wherein the electronic control unit includes:

an evaluation block that determines a first continuing state when a determination result of the electronic control unit is changed from the OFF state to the ON state and then changed to the OFF state and then the OFF state is continuously maintained for a predetermined time period, and that determines a second continuing state when the determination result of the electronic control unit is changed from the ON state to the OFF state and then changed to the ON state and then the ON state is continuously maintained for the predetermined time period; and a correction block that increases the determination threshold to a predetermined value when the evaluation means determines the first continuing state, and that decreases the determination threshold to the predetermined value when the evaluation block determines the second continuing state.

* * * * *